Patented Apr. 13, 1937

2,077,060

UNITED STATES PATENT OFFICE 2,077,060

DEODORIZING COMPOSITION

Alexander R. White, Mimico, Ontario, Canada, assignor to Deodor-X Company of Canada Limited, Montreal, Quebec, Canada No Drawing. Application December 7, 1933, Serial No. 701,363

5 Claims. (Cl. 167—13)

This invention relates to the manufacture of a deodorant with high germicidal properties which is adapted for the purpose of removing odors resulting from organic substances undergoing fermentation or putrefaction. The composition is particularly useful in connection with vehicles or vessels used in transportation service, although it has a wide range of uses in connection with the deodorization of washrooms, etc., in public buildings, schools or the like.

The composition of the deodorant contemplated in this invention consists, in its preferred form, of a combination of ingredients comprising formaldehyde, an alkali, potash soap, an essential oil and water. In its acid form, formaldehyde, besides being highly volatile and extremely difficult to apply with impunity, has a comparatively low pH value, has limited wetting properties, has little affinity for substances undergoing fermentation or putrefaction and has limited deodorizing properties. By changing the formaldehyde from an acid to an alkaline condition, however, its characteristics are immediately altered so that its pH value is greatly increased, as well as its wetting properties and it also develops a high degree of affinity for and ability to combine with offensive organic substances with which it is placed in contact.

In carrying out my invention, I combine formaldehyde with an alkali, preferably sodium metasilicate ($Na_2SIO_3 5H_2O$), an aromatic substance, such as an essential oil, a potash soap, and water. These ingredients are mixed in the following approximate proportions:

To make an imperial gallon of the deodorant substance, I mix approximately 400 c. c. of a 40% solution of formaldehyde ($CH_2O$) with a solution of approximately 200 c. c. (containing 1 oz. dry measure) of sodium metasilicate, approximately 30 c. c. of an essential oil solution or emulsion (containing about equal parts of essential oil, caustic soda and potash soap) and approximately 30 c. c. of a 20% solution of potash soap, and about 4140 c. c. of water. In making the sodium metasilicate solution, one ounce, dry measure, (30 c. c.) is dissolved in about 170 c. c. of water. In order to make the essential oil, such as aromatic balsam, miscible with water and with the rest of the mixture, it is necessary to mix it with caustic soda and a soap solution. To form a solution or emulsion of this essential oil containing about 30 c. c., I therefore take about 10 c. c of the essential oil, 10 c. c. of caustic ($NaOH$) and 10 c. c of a potash soap solution. When thoroughly mixed together, the potash soap solution will saponify the essential oil and the mixture will form an emulsion that may be easily mixed with the remaining ingredients of the composition.

When making up a quantity of the composition, the above mentioned ingredients, in the proper proportions, are placed in separate tanks, each of which is connected to a larger tank so that the contents will flow by gravity into the larger receiving tank. When the proper quantity of formaldehyde and water, alkali sodium metasilicate, soap solution and essential oil emulsion have been emptied into the receiving tank, the contents are stirred or agitated for about one hour until the mixing of the ingredients is complete. The acid formaldehyde in contact with the sodium metasilicate becomes highly alkaline and the resultant mixture of the ingredients given in the formula above mentioned has a pH value of about 9.8, has a high germicidal efficiency and true deodorizing properties. This composition and its resultant action upon organic substances, differs from the usual oxidizing agents, such as ozone, hypochlorite or perborate, in that while these are oxidizing agents and are somewhat destructive in their application, the present composition, because of its affinity for and its ability to combine with organic substances undergoing fermentation or putrefaction, acts by combining with these offensive substances so that, after contact has taken place for about one hour, new compounds are formed which are both odorless and sterile, without any of the destructive influences of the oxidizing agents above mentioned. The ingredients in the composition remain in colloidal suspension indefinitely and, as the substance is non-toxic and non-injurious, it may be applied with perfect impunity to any class of equipment requiring deodorant or disinfectant treatment. It may be applied, for instance, to cleanse and deodorize refrigerator car equipment where the resultant odors from fermentation and putrefaction of organic substances have rendered the car unfit for further service for a considerable period of time. Refrigerator cars or the like treated with this composition are completely disinfected and deodorized so that they may again be put into service within a few hours. For such service, the ingredients may be mixed in the proportions above specified in which the proportion of formaldehyde solution constitutes approximately 10% by weight of the whole. The proportion of formaldehyde may, however, be varied according to the class of equipment or material requiring treatment. For example, for disinfecting and deodorizing sleeping car equipment or the like, about 5% of the formaldehyde solution would be sufficient, while for use in office buildings, washrooms and the like, about 2% of the formaldehyde solution would be sufficient. It is essential, however, that an alkali, such as sodium metasilicate, be mixed with the formaldehyde so as to change the mixture from an acid to an alkaline condition. The addition of the essential oil is chiefly for the purpose of giving an agreeable odor to the mixture and other oils besides aromatic balsam may be used. The potash soap solution is effective in maintaining the ingredients in colloidal suspension so that no settling or precipitation occurs. In using this composition, no odor of formaldehyde can be detected unless and until the particles become finely divided and dispersed in contact with air.

What I claim is:—

1. In a disinfectant and deodorant compound the combination of formaldehyde with sodium metasilicate in proportions giving a definitely alkaline product.

2. In a disinfectant and deodorant compound the combination of formaldehyde with sodium metasilicate in proportions giving to the product a pH value of approximately 9.8.

3. A disinfectant and deodorant compound comprising formaldehyde mixed with sodium metasilicate in substantially the proportions of one part of sodium metasilicate solution to two parts of a 40% solution of formaldehyde.

4. A disinfectant and deodorant compound comprising approximately 10% of a 40% solution of formaldehyde, approximately 5% of a solution of sodium metasilicate, and approximately 85% of water.

5. A disinfectant and deodorant compound comprising approximately 10% or less of a 40% solution of formaldehyde, approximately 5% or less of sodium metasilicate solution, approximately 85% of water, and approximately 2% of emulsifying ingredients and aromatic agents.

ALEXANDER R. WHITE.